United States Patent [19]

Reger et al.

[11] 4,452,538
[45] Jun. 5, 1984

[54] APPARATUS FOR MEASURING THE TEMPERATURE DISTRIBUTION ALONG THE INSIDE WALLS OF NARROW, SHAFT-SHAPED SPACES

[75] Inventors: Jürgen Reger, Kohlberg; Bhubaneswar Sarangi, Recklinghausen; Werner Eisenhut, Essen; Richard Reger, Kohlberg, all of Fed. Rep. of Germany

[73] Assignee: Bergwerksverband GmbH, Essen, Fed. Rep. of Germany

[21] Appl. No.: 374,611

[22] Filed: Apr. 30, 1982

[30] Foreign Application Priority Data

May 7, 1981 [DE] Fed. Rep. of Germany ........ 3118080

[51] Int. Cl.³ .............................................. G01K 1/02
[52] U.S. Cl. .................................... 374/124; 250/347; 356/43; 374/130; 374/137
[58] Field of Search ...................... 374/124, 137, 130; 250/347; 356/43

[56] References Cited

U.S. PATENT DOCUMENTS 3,600,947  8/1971  Farabaugh ..................... 374/124 X
3,749,928  7/1973  Jamet et al. .......................... 250/347

*Primary Examiner*—Gerald Goldberg
*Assistant Examiner*—Joseph W. Roskos
*Attorney, Agent, or Firm*—Michael J. Striker

[57] ABSTRACT

Apparatus for measuring the temperature distribution along the inside walls of narrow, shaft-shaped spaces such as heating flues of coking and similar ovens using a radiation pyrometer with an evaluating arrangement, whereby a radiation optical system is disposed at one of the ends of the space and contains a mirror tiltable about an axis, for optical coverage of the entire length of the space and forwarding of the detected radiation into the path of rays to be evaluated, as well as a positioning arrangement for tilting the mirror over the area to be optically covered. Therewith a fixed mirror is arranged after the tilting mirror and the path of rays to be evaluated is focused to the end of a photoconductor, which, in a transportable and coolable measuring lance, is directed to an evaluating arrangement. The measuring lance can be coarsely and finely positioned by means of a carriage arrangement.

7 Claims, 3 Drawing Figures

APPARATUS FOR MEASURING THE TEMPERATURE DISTRIBUTION ALONG THE INSIDE WALLS OF NARROW, SHAFT-SHAPED SPACES

BACKGROUND OF THE INVENTION

The invention concerns an apparatus for measuring the temperature distribution along the inside walls of narrow, shaft-shaped spaces such as heating flues of coking and similar ovens.

With measurements of temperature distributions, what is important is a best possible resolution. With narrow, shaft-shaped spaces such as heating flues of coking and similar ovens, the measuring situation is particularly difficult, since relatively high temperatures of e.g. more than 1000° C. are to be detected, and the length-diameter ratio of such spaces is extraordinarily great, which makes a good temperature resolution in the direction of the longitudinal dimension of the space particularly difficult.

For the measurement of temperature distributions of heating flues in coking ovens, it is known to lower a temperature-measuring probe to the bottom of the heating flue to be measured. This causes already with 4 m deep heating flues considerable difficulties, since they are to be reached from above only through an about 2 m thick cover. This leads to the use of very inconvenient measuring carts, and necessitates a considerable expenditure of time, also occasioning thereby an undesirable cooling-down effect. Such a measuring probe impedes also, on account of its size, the operation of the travelling charging car above the coking oven top. Finally, the measuring probe must be protected through gold-plating its outer surface against the high temperatures.

For proper temperature measurement it is known to introduce the infrared radiation coming from the wall of the heating flue across a stationary tiltable mirror and an ancillary lens of a silicon photoelement.

SUMMARY OF THE INVENTION

The object of the invention is therefore generally the elimination of the above mentioned disadvantages. In particular, it is to provide an easily manipulable, as small as possible and light apparatus of the above mentioned type, with which at lowest possible personal and material expense a high temperature resolution is obtained in shorter measuring and insertion times, with lowest possible loss of heat.

This object is attained according to the present invention with an apparatus having a radiation pyrometer with a radiation optical system disposed at one end of the space to be measured, composed of a mirror, tiltable about its axis transverse to the longitudinal axis of the space, for optical coverage of the entire length of the space and forwarding of the detected radiation into the path of rays to be evaluated, and a positioning arrangement for tilting the mirror over the area to be optically covered, and an itself known evaluating arrangement.

The radiation optical system, on account of its arrangement at one of the ends of the space to be measured, thus does not have to be directly exposed to the high temperatures prevailing therein. With it it is possible, from a fixed point at an indeed extreme position, to cover the temperature distribution over the entire length of the wall to be measured, without the optical system having to be moved as a whole. The result is that there occurs neither vibrations nor other inaccuracies to the measuring results, caused by a lowering operation.

The precision of the measurements is increased according to an embodiment of the invention, by having the axis of rotation of the mirror cut perpendicular to the optical axis of the radiation optical system, i.e. it thus lies in the reflecting plane of the mirror.

An improvement in resolution and reduction of picked up measuring defects is thereby obtained, when according to another embodiment of the invention a fixed mirror is disposed in the path of rays between the path of rays to be evaluated and the tiltable mirror. Herewith it is possible to considerably reduce the tilting angle of the tiltable mirror, e.g. to. a magnitude of about 20°, with a space about 4 m long, with a shortest wall separation to the radiation optical system of only about 35 cm. With such an embodiment it is preferred to arrange the path of rays to be evaluated and the tiltable mirror at the greatest possible transverse distance, relative to the longitudinal axis of the space. Thereby is obtained an extraordinarily compact construction of the radiation optical system and a greater measurable angular range.

A radiation-permeable plate, protecting the radiation optical system, is in more advantageous manner according to a further embodiment of the invention, disposed in the path of rays between the wall to be measured and the tiltable mirror, in order to, among other things, protect the optical system. Therewith an angular position of about 45° to the wall to be measured is particularly advantageous; this above all also in regard to a smallest possible dimension of the measuring head containing the radiation optical system.

The tilting of the mirror is possible in particularly precise manner according to the present invention through a step motor.

By means of a rocking level positioning the tiltable mirror, operated by the positioning arrangement, the narrow spatial proportions in the measuring head can sustain particularly good reckoning.

Through a spring engaging the tiltable mirror, cooperating with the positioning arrangement, it is provided according to the present invention, that the tiltable mirror can always follow the movement of the positioning arrangement, free from play.

Above all, using the radiation optical system over a greater distance to the measuring position, it can be of particular advantage, with narrow access proportions to the measuring position, when, according to a further embodiment of the invention, a photoconductor is used for the radiation to be evaluated.

The mode of action of the radiation optical system, with regard to the measuring position, makes possible, according to a further embodiment of the invention, a tube-shaped measuring lance containing the system at one of its ends. Herewith an exact positioning of the radiation optical system to the measuring position is possible. A wall of the measuring lance, cooled according to the present invention with a cooling agent, protects all apparatus disposed in it against increased temperatures, also occurring outside of the actual space to be measured. Herewith is obtained moreover a certain temperature stability in the interior of the measuring lance upon proceeding from one measuring position to another.

According to a further embodiment of the invention, a carriage arrangement for placing the radiation optical system at its position of use facilitates considerably the transportation and positioning thereof. According to the present invention a mounting cart led outside of the space in its longitudinal direction for admission of the end of the measuring lance turned away from the radiation optical system effects such an operation of the radiation optical system with respect to the measuring position.

Particularly with spatially cramped (narrow) proportions, as they are provided by transport arrangements at the top of a coke oven battery, a guide rail, folding transverse to the guiding direction of the mounting cart, facilitates positioning according to the present invention.

According to a further embodiment of the invention, fine positioning means provided for the measuring lance makes possible an exact positioning of the radiation optical system in different measuring positions, diverging slightly from one another in their spatial configuration. Such a case is provided e.g. with insertion into coke oven batteries, based upon different heat delays. Therewith the measuring lance can not only be finely positioned, entirely with permanent alignment in the space, in a plane transverse to this alignment, but also a definite tilting of the measuring lance with regard to the normal alignment is possible.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
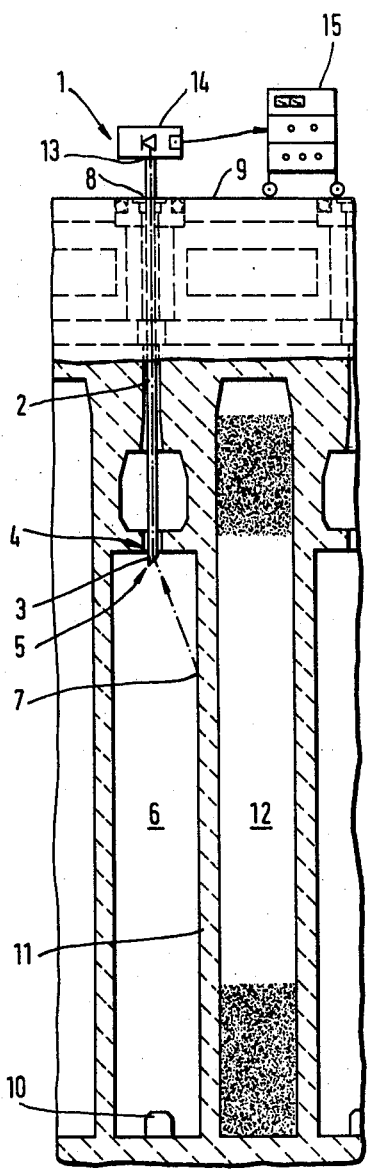
FIG. 1 shows the schematic construction of an arrangement according to the present invention, together with the space to be measured, partially in section.

FIG. 1 shows a radiation pyrometer 1 with a measuring lance 2 and a radiation optical system 3 provided at end 4 of the measuring lance. The radiation optical system 3 is located at end 5 (upper end) of space 6, the temperature distribution of inside wall 7 of which is to be measured.

Space 6, represented here as heating flue of a coke oven battery, with a length of about 4 m and a width of about 0.7 m, is reached through an aperture 8 in the top 9 of the coke oven battery across an about 2 m long connecting canal. The admission of combustion gas into space 6 follows across a nozzle block 10, with heating wall 11 formed from stretcher bricks representing a division between coking chamber 12 and space 6.

On the end 13 of the measuring lance, opposite from radiation optical system 3, is disposed essentially the optical parts 14 of the evaluating arrangement 14, 15.

Figure 2:
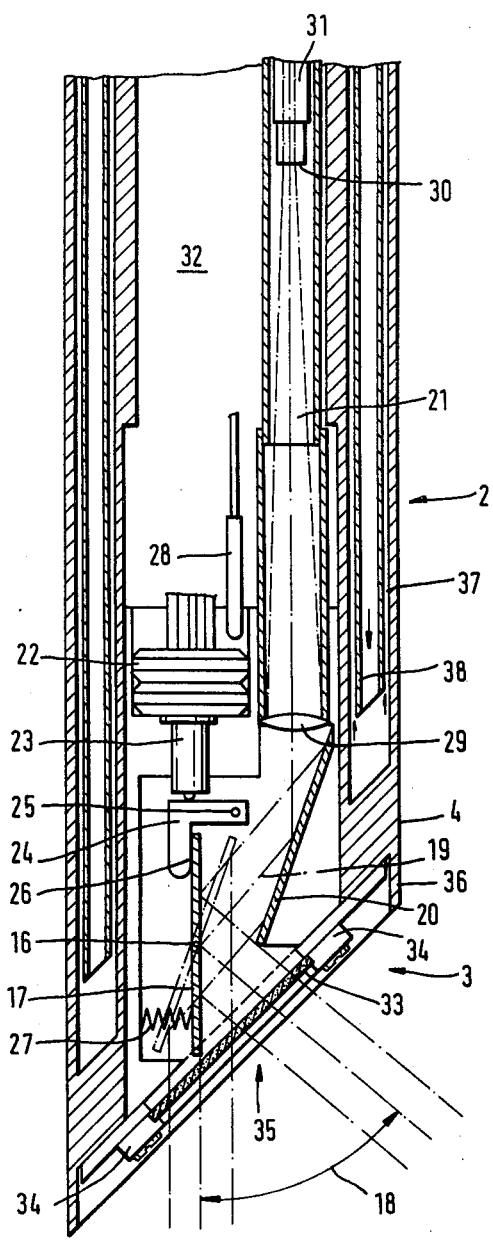
FIG. 2 shows a radiation optical system according to the present invention, partially in section, as an enlarged portion from FIG. 1.

In FIG. 2 the radiation optical system 3 at end 4 of the measuring lance 2 accommodates and contains a mirror 17, tiltable about its axis 16, for optical coverage of the entire angle range 18, which is given by the length of the wall to be measured and the smallest wall clearance of the radiation optical system. Therewith the tilting axis 16 of mirror 17 cuts the optical axis 19 of the radiation optical system 3 at a right angle. A fixed mirror 20 is so disposed in the path of rays between the path of rays 21 to be evaluated and the tiltable mirror 17, that parallelism prevails between both mirrors, in the mirror position given for coverage of the most distant measuring point. The radiation optical system 3 includes, in addition, a positioning arrangement 22, preferably formed as a step motor, with which over a driving rod 23 a rocking lever 24, formed as a toggle lever, is shifted about its axis 25. For coverage of the nearest measuring point, the mirror 17 is aligned preferably parallel to the longitudinal axis of measuring lance 2, and lies on the leg 26 of rocking lever 24. In the position for the most distant measuring point, which preferably lies in an axial direction of the measuring lance 2, the mirror 17 has to be deviated e.g. only about 20 degrees relative to the other extreme position. A spring 27 provides for fixed counterpressure of mirror 17 on rocking lever 24.

The positioning arrangement 22 makes possible a tilting of mirror 17, precise and producible following in definite steps, so that a precise coordination of the radiation intercepted in the individual mirror positions, to concrete surface areas of the wall to be measured, is possible.

A temperature-detecting element 28, e.g. a thermoelement, makes possible the surveillance and avoidance of excess temperatures in the area of radiation optical system 3.

A converging lens 29 focuses the rays proceeding from mirror 20 of the path of rays 21 to be evaluated to the end 30 of a photoconductor 31, which is directed in the interior space 32 of measuring lance 2 to the evaluating arrangement 14.

A plate 33, permeable for the radiation to be measured and preferably plane-parallel, of e.g. quartz glass, is with holding means 34, e.g. screws, fastened to the end plane 35 of measuring lance 2, oblique to its axis. Therewith is formed a sight window for the radiation optical system 3, aimed at the wall to be measured, which can be narrowed down through a shielding slit transverse to angle range 18, so that through a turning of the measuring lance different, very thin surface strips of the wall to be measured can be covered. A front-end collar 36 of measuring probe 2 protects the end plane 35 against injury.

Through arrangement of the measuring lance 2 as a double-walled tube there is produced a cooling space 37, into which cooling agent feed pipe 38 is lowered until the area of the radiation optical system 3, whereby the latter can be held to a comparatively low temperature.

Figure 3:
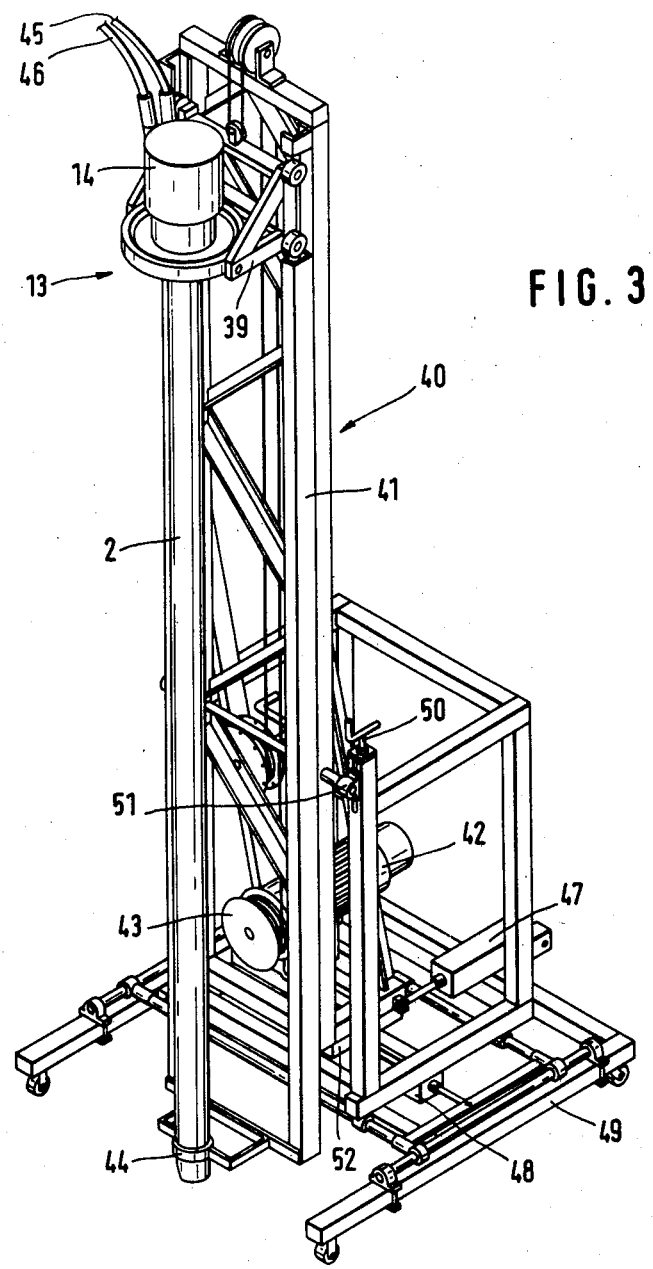
FIG. 3 is a perspective representation of a carriage arrangement according to the present invention, partially in section.

In FIG. 3 the measuring lance 2 is held at its end 13 together with the optical evaluating arrangement 14, by a mounting cart 39 of carriage arrangement 40, whereby the mounting cart 39 is guided in guide rails 41.

With the aid of a motor 42 and a thereby driven cable drum 43, the mounting cart 39 can be transported. Therewith a radius link or sliding guiding 44 provides for a steady alignment of measuring lance 2. Cooling agent tubes 45, 46 provide for the supply and removal of cooling agent. A not represented lead runs from the optical evaluating arrangement 14 to a control and recording device 15, which as a compact unit can also contain a refrigerator for the cooling agent.

Particularly advisable is the insertion of particularly more efficient and lighter cooling agent, such as freon.

Fine positioning arrangements 48 and 52 in the transportable frame 49 make possible a lance positioning—in a plane—with constant alignment thereof, whereas the fine positioning arrangement 47 and 50 make possible an alteration of the lance alignment, e.g. in the form of an adjustment of the displacing device of the measuring lance through inclined openings.

At its end 13 (upper end), the measuring lance 2 can also be rotated about its own axis, in order to adjust the radiation optical system 3 to the desired alignment to thin wall strips.

A pivot bearing 51 transverse to guide rail 41 makes possible a halt to movement therein, as soon as the lance 2 has been completely lowered into the space to be measured. The measuring range and the resolution of the radiation pyrometer, e.g. a spectral pyrometer, can be freely selected according to the object to be accomplished. Likewise it is possible, through an itself known electronic evaluation of the measuring results, to perform not only a continuous temperature measurement along the entire covered measuring surface strips, but also a point-focal temperature coverage.

It will be understood that each of the elements described above, or two or more together, may also find a useful application in other types of radiation measurements differing from the types described above.

While the invention has been illustrated and described as embodied in an apparatus for measuring the temperature distribution along the inside walls of narrow, shaft-shaped spaces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims. We claim:

1. Apparatus for measuring the temperature distribution along the inside walls of narrow shaft-shaped spaces such as heating flues of coking and similar ovens, comprising a radiation pyrometer including a tube-shaped measuring lance and a radiation optical system at one of its ends, said radiation optical system being disposed at one end of the space and including a first mirror, tiltable about its axis transverse to the longitudinal axis of the space, for optical coverage of the entire length of the space and forwarding the detected radiation into a path of rays to be evaluated, a second mirror fixed in the path of rays between the path of rays to be evaluated and said first tiltable mirror, and a radiation-permeable plate in the path of rays between the wall to be measured and the tiltable mirror; a photoconductor for the path of rays to be evaluated; a positioning arrangement within said measuring lance for tilting said first mirror over the area to be optically covered, said positioning arrangement including a stepping motor, a rocking lever for positioning the tiltable mirror and operated by said stepping motor, and a spring engaging the tiltable mirror, cooperating with said stepping motor; and an evaluating arrangement, said measuring lance having a wall cooled by cooling means.

2. Apparatus according to claim 1, wherein the axis of rotation of the mirror cuts perpendicular to the optical axis of the radiation optical system.

3. Apparatus according to claim 1, further comprising a carriage arrangement for transporting the radiation optical system to its position of use.

4. Apparatus according to claim 3, further comprising a mounting cart led outside of the space in its longitudinal direction, for admission of the end of the measuring lance turned away from the radiation optical system.

5. Apparatus according to claim 4, further comprising a guide rail turnable about transverse to the guiding direction of the mounting cart.

6. Apparatus according to claim 3, further comprising fine positioning means for the measuring lance.

7. Apparatus according to claim 1, and further comprising a temperature-detecting element mounted in said measuring lance in the area of said radiation optical system.

* * * * *